(12) United States Patent
Ayazi et al.

(10) Patent No.: US 9,970,764 B2
(45) Date of Patent: May 15, 2018

(54) BULK ACOUSTIC WAVE GYROSCOPE WITH SPOKED STRUCTURE

(75) Inventors: Farrokh Ayazi, Atlanta, GA (US); Wang-kyung Sung, Atlanta, GA (US); Mohammad Faisal Zaman, Worcester, MA (US)

(73) Assignee: Georgia Tech Research Corporation, Atlanta, GA (US)

( * ) Notice: Subject to any disclaimer, the term of this patent is extended or adjusted under 35 U.S.C. 154(b) by 564 days.

(21) Appl. No.: 13/393,291

(22) PCT Filed: Aug. 31, 2010

(86) PCT No.: PCT/US2010/047305
§ 371 (c)(1),
(2), (4) Date: May 14, 2012

(87) PCT Pub. No.: WO2011/026100
PCT Pub. Date: Mar. 3, 2011

(65) Prior Publication Data
US 2012/0227487 A1    Sep. 13, 2012

Related U.S. Application Data

(60) Provisional application No. 61/238,433, filed on Aug. 31, 2009.

(51) Int. Cl.
*G01C 19/5698* (2012.01)
*G01C 19/56* (2012.01)

(52) U.S. Cl.
CPC ......... *G01C 19/5698* (2013.01); *G01C 19/56* (2013.01)

(58) Field of Classification Search
CPC  G01C 19/5719; G01C 19/56; G01C 19/5607;
G01C 19/5649; G01C 19/5642; G01C 19/5691; G01C 19/5684; G01C 19/5677; G01C 19/5698; G01C 19/567
USPC ......................................... 73/504.12, 504.13
See application file for complete search history.

(56) References Cited

U.S. PATENT DOCUMENTS

| | | | |
|---|---|---|---|
| 3,513,356 | A | 5/1970 | Newell |
| 3,634,787 | A | 1/1972 | Newell |
| 3,719,074 | A | 3/1973 | Lynch |
| 4,644,793 | A | 2/1987 | Church |

(Continued)

FOREIGN PATENT DOCUMENTS

| | | |
|---|---|---|
| EP | 0773429 A1 | 5/1997 |
| JP | 2002509615 | 3/2002 |

(Continued)

*Primary Examiner* — Helen Kwok
(74) *Attorney, Agent, or Firm* — Burns & Levinson LLP; Bruce D. Jobse

(57) ABSTRACT

A Coriolis-based bulk acoustic wave gyroscope includes a center-supported resonating element with capacitively-coupled drive, sense, and control electrodes. The resonating element has a first substantially solid or perforated region which is connected to the center-support by a second region characterized by a plurality of spokes or beams. When operating in a resonance state, the first region undergoes a bulk acoustic mode of vibration while the second region undergoes a flexural mode of vibration. Energy losses associated with the flexural mode of vibration reduce the overall quality factor (Q) at high resonance frequencies creating a large bandwidth and a fast response time without needing vacuum.

29 Claims, 15 Drawing Sheets

(56) References Cited

U.S. PATENT DOCUMENTS

| | | | |
|---|---|---|---|
| 4,655,081 A | 4/1987 | Burdess | |
| 4,674,331 A | 6/1987 | Watson | |
| 4,793,195 A | 12/1988 | Koning | |
| 5,162,691 A | 11/1992 | Mariani et al. | |
| 5,196,905 A | 3/1993 | Hahn et al. | |
| 5,226,321 A | 7/1993 | Varnham et al. | |
| 5,349,855 A | 9/1994 | Bernstein et al. | |
| 5,426,070 A | 6/1995 | Shaw et al. | |
| 5,450,751 A | 9/1995 | Putty et al. | |
| 5,488,863 A | 2/1996 | Mochida et al. | |
| 5,491,604 A | 2/1996 | Nguyen et al. | |
| 5,587,620 A | 12/1996 | Ruby et al. | |
| 5,589,082 A | 12/1996 | Lin et al. | |
| 5,663,505 A | 9/1997 | Nakamura | |
| 5,719,073 A | 2/1998 | Shaw et al. | |
| 5,728,936 A | 3/1998 | Lutz | |
| 5,780,739 A | 7/1998 | Kang et al. | |
| 5,780,740 A | 7/1998 | Lee et al. | |
| 5,783,749 A | 7/1998 | Lee et al. | |
| 5,846,849 A | 12/1998 | Shaw et al. | |
| 5,847,454 A | 12/1998 | Shaw et al. | |
| 5,873,153 A | 2/1999 | Ruby et al. | |
| 5,884,378 A | 3/1999 | Dydyk | |
| 5,894,647 A | 4/1999 | Lakin | |
| 5,911,156 A | 6/1999 | Ward et al. | |
| 5,914,801 A | 6/1999 | Dhuler et al. | |
| 5,920,012 A | 7/1999 | Pinson | |
| 5,945,599 A | 8/1999 | Fujiyoshi et al. | |
| 5,976,994 A | 11/1999 | Nguyen et al. | |
| 5,992,233 A | 11/1999 | Clark | |
| 5,998,906 A | 12/1999 | Jerman et al. | |
| 6,000,280 A | 12/1999 | Miller et al. | |
| 6,051,866 A | 4/2000 | Shaw et al. | |
| 6,060,818 A | 5/2000 | Ruby et al. | |
| 6,067,858 A | 5/2000 | Clark et al. | |
| 6,087,747 A | 7/2000 | Dhuler et al. | |
| 6,121,552 A | 9/2000 | Brosnihan et al. | |
| 6,128,954 A | 10/2000 | Jiang | |
| 6,134,042 A | 10/2000 | Dhuler et al. | |
| 6,192,756 B1 | 2/2001 | Kikuchi et al. | |
| 6,215,375 B1 | 4/2001 | Larson, III et al. | |
| 6,230,563 B1 | 5/2001 | Clark et al. | |
| 6,236,281 B1 | 5/2001 | Nguyen et al. | |
| 6,238,946 B1 | 5/2001 | Ziegler | |
| 6,239,536 B1 | 5/2001 | Lakin | |
| 6,256,134 B1 | 7/2001 | Dhuler et al. | |
| 6,257,059 B1 | 7/2001 | Weinberg et al. | |
| 6,275,122 B1 | 8/2001 | Speidell et al. | |
| 6,275,320 B1 | 8/2001 | Dhuler et al. | |
| 6,291,931 B1 | 9/2001 | Lakin | |
| 6,296,779 B1 | 10/2001 | Clark et al. | |
| 6,348,846 B1 | 2/2002 | von Gutfeld et al. | |
| 6,373,682 B1 | 4/2002 | Goodwin-Johansson | |
| 6,377,438 B1 | 4/2002 | Deane et al. | |
| 6,391,674 B2 | 5/2002 | Ziegler | |
| 6,413,793 B1 | 7/2002 | Lin et al. | |
| 6,428,713 B1 | 8/2002 | Christenson et al. | |
| 6,429,755 B2 | 8/2002 | Speidell et al. | |
| 6,433,401 B1 | 8/2002 | Clark et al. | |
| 6,480,645 B1 | 11/2002 | Peale et al. | |
| 6,481,285 B1 * | 11/2002 | Shkel | G01C 19/5719 73/504.13 |
| 6,485,273 B1 | 11/2002 | Goodwin-Johansson | |
| 6,495,892 B2 | 12/2002 | Goodman et al. | |
| 6,497,141 B1 | 12/2002 | Turner et al. | |
| 6,539,801 B1 | 4/2003 | Gutierrez et al. | |
| 6,555,201 B1 | 4/2003 | Dhuler et al. | |
| 6,600,389 B2 | 7/2003 | Ma et al. | |
| 6,628,177 B2 | 9/2003 | Clark et al. | |
| 6,707,351 B2 | 3/2004 | Gorrell | |
| 6,742,389 B2 | 6/2004 | Nguyen et al. | |
| 6,837,107 B2 | 1/2005 | Geen | |
| 6,848,304 B2 | 2/2005 | Geen | |
| 6,856,217 B1 | 2/2005 | Clark et al. | |
| 6,889,550 B2 * | 5/2005 | Beitia | 73/504.12 |
| 6,909,221 B2 | 6/2005 | Ayazi et al. | |
| 6,985,051 B2 | 1/2006 | Nguyen et al. | |
| 7,023,065 B2 * | 4/2006 | Ayazi | H03H 3/0072 257/414 |
| 7,176,770 B2 | 2/2007 | Ayazi et al. | |
| 7,360,423 B2 | 4/2008 | Ayazi et al. | |
| 7,543,496 B2 | 6/2009 | Ayazi et al. | |
| 7,633,360 B2 * | 12/2009 | Weigold | H03H 9/2431 257/415 |
| 7,639,104 B1 * | 12/2009 | Quevy | H03H 3/0076 333/186 |
| 7,987,714 B2 * | 8/2011 | DeNatale | G01C 19/5684 29/592.1 |
| 8,011,246 B2 * | 9/2011 | Stewart | G01C 19/5684 73/1.37 |
| 8,056,413 B2 * | 11/2011 | Yazdi | 73/504.13 |
| 8,528,404 B2 * | 9/2013 | Ayazi | G01P 15/097 73/514.29 |
| 2001/0039834 A1 | 11/2001 | Hsu | |
| 2003/0000306 A1 * | 1/2003 | Fell | 73/504.12 |
| 2003/0006468 A1 | 1/2003 | Ma et al. | |
| 2003/0127944 A1 | 7/2003 | Clark et al. | |
| 2003/0196490 A1 | 10/2003 | Cardarelli | |
| 2004/0055380 A1 * | 3/2004 | Shcheglov et al. | 73/504.12 |
| 2004/0060898 A1 | 4/2004 | Tsai | |
| 2004/0065940 A1 | 4/2004 | Ayazi et al. | |
| 2004/0226377 A1 | 11/2004 | Tsugai et al. | |
| 2005/0016270 A1 * | 1/2005 | Chen et al. | 73/504.13 |
| 2005/0028591 A1 | 2/2005 | Lonsdale et al. | |
| 2005/0150296 A1 | 7/2005 | Painter et al. | |
| 2005/0150297 A1 | 7/2005 | Ayazi et al. | |
| 2005/0172714 A1 | 8/2005 | Challoner et al. | |
| 2005/0195050 A1 | 9/2005 | Lutz et al. | |
| 2005/0242904 A1 | 11/2005 | Lutz et al. | |
| 2006/0037417 A1 | 2/2006 | Shcheglov et al. | |
| 2006/0044078 A1 | 3/2006 | Ayazi et al. | |
| 2006/0225504 A1 * | 10/2006 | Ayazi et al. | 73/504.12 |
| 2006/0273416 A1 | 12/2006 | Ayazi et al. | |
| 2007/0017287 A1 * | 1/2007 | Kubena | G01C 19/5684 73/504.02 |
| 2007/0034005 A1 | 2/2007 | Acar et al. | |
| 2007/0089519 A1 * | 4/2007 | Hao | G01H 11/08 73/649 |
| 2007/0119258 A1 | 5/2007 | Yee | |
| 2007/0220971 A1 * | 9/2007 | Ayazi | G01C 19/5698 73/504.02 |
| 2007/0240508 A1 | 10/2007 | Watson | |
| 2008/0148846 A1 | 6/2008 | Whelan et al. | |
| 2009/0064782 A1 * | 3/2009 | Yazdi | 73/504.13 |
| 2009/0095077 A1 * | 4/2009 | DeNatale | G01C 19/5684 73/504.13 |
| 2009/0188318 A1 * | 7/2009 | Zarabadi et al. | 73/504.12 |
| 2009/0266162 A1 | 10/2009 | Ayazi | |
| 2010/0058861 A1 * | 3/2010 | Kuang et al. | 73/504.12 |
| 2010/0107761 A1 * | 5/2010 | Ofri et al. | 73/504.13 |
| 2010/0218606 A1 * | 9/2010 | Fell | 73/504.13 |

FOREIGN PATENT DOCUMENTS

| | | |
|---|---|---|
| JP | 2004320759 | 11/2004 |
| JP | 2005535889 | 11/2005 |
| WO | 2007126423 A2 | 11/2007 |
| WO | 2011026100 A1 | 3/2011 |

* cited by examiner

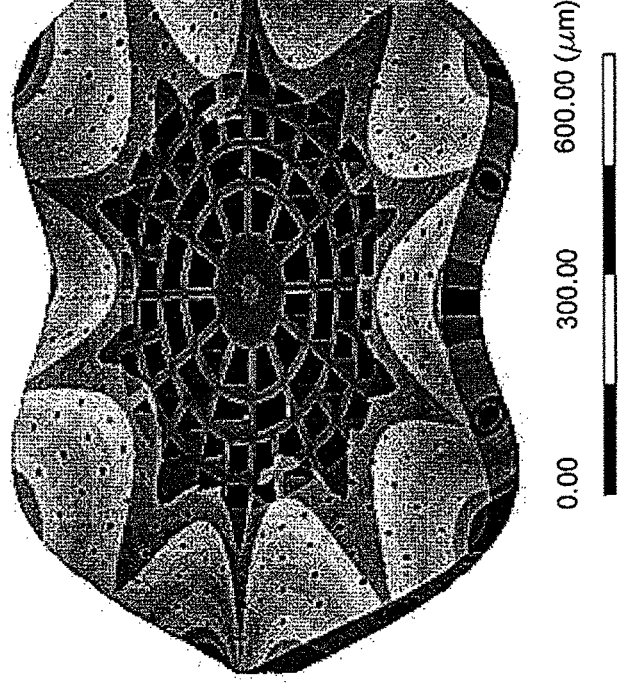
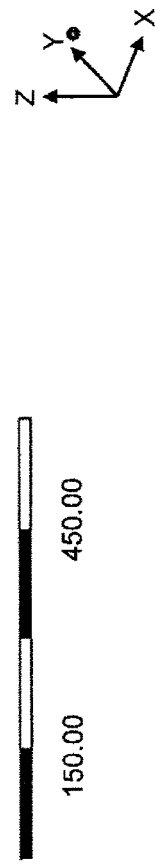
FIG. 2E

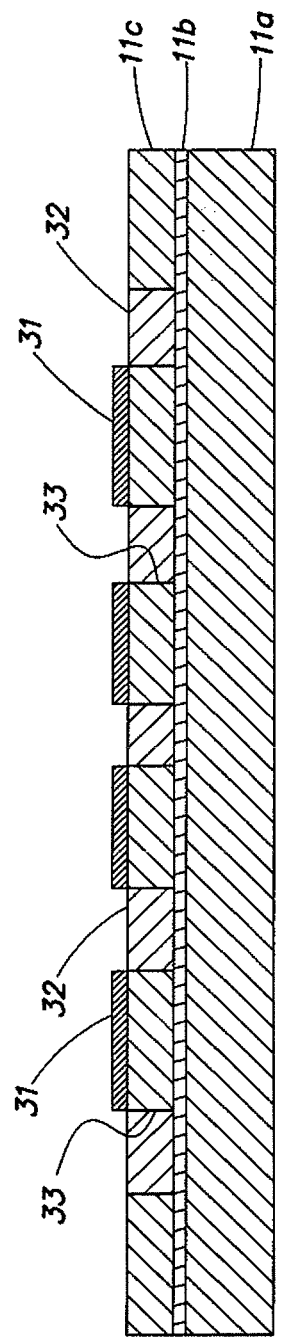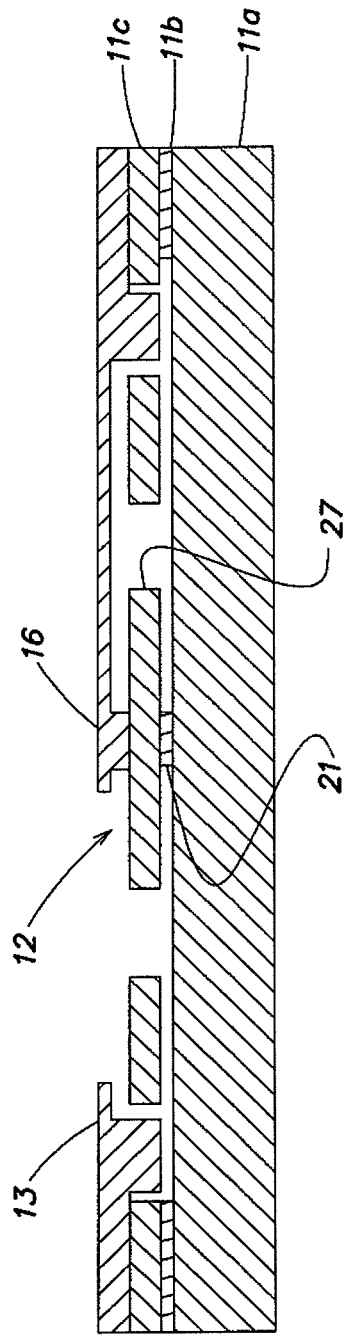

BULK ACOUSTIC WAVE GYROSCOPE WITH SPOKED STRUCTURE

CROSS REFERENCE TO RELATED APPLICATIONS

This application is a U.S. national stage application under 35 U.S.C. 371 of PCT/US10/47305 filed Aug. 31, 2010, which in turn claims priority to U.S. Provisional Patent Application Ser. No. 61/238,433, filed Aug. 31, 2009, the subject matter of which are incorporated herein by these references in their entirety for all purposes.

FIELD OF THE INVENTION

The present invention generally to MEMS gyroscopes, and, in particular, to a bulk acoustical wave gyroscope having improved bandwidth and dynamic range.

BACKGROUND OF THE INVENTION

Micromachined vibratory gyroscopes are increasingly used in applications that require large dynamic range and large bandwidth such as gaming controllers and smart user interfaces. The popularity of such gyroscopes has grown, in large part, due to their low cost, small size, robustness and low power consumption, attributes which had been hardly achievable with conventional gyroscopes. One such gyroscopic device is disclosed in U.S. Pat. No. 7,543,496, entitled "Bulk Acoustical Wave Gyroscope," the subject matter which is incorporated herein by this reference for all purposes.

It is well-known that wide-bandwidth gyroscopes can transfer Coriolis signal to the sense mode faster than narrow bandwidth devices, ensuring a faster response time. However, in mode-matched gyroscopes the increased bandwidth is usually limited by the operating frequency, which is inversely proportional to the dimension of the vibrating mass, and hence the capacitive sense area. Vibratory microgyroscopes operating at mode-matched condition use two resonance modes of a structure with almost identical frequencies to amplify the Coriolis force induced vibration by the mechanical quality factor of the sense mode. However, because of imperfections in the fabrication process, the native drive and sense resonance modes of these devices may exhibit a frequency separation. DC voltage potentials are thus applied in a calibration step to adjust the electrical stiffness of the drive and sense resonance modes and to make their pass-bands overlap. Accordingly, a need exists for a gyroscope with an increased resonator bandwidth that is larger than the worst-case frequency separation caused by errors introduced during the fabrication of the devices.

Additionally, the bandwidth of a gyroscope restricts the response time and the operational range of the system. In order to achieve wider bandwidth, previous solid disk configurations employed high-frequency designs obtained from smaller device dimensions. However, decreased device dimension results in reduced capacitive area and sensitivity. Accordingly, a need exists for a gyroscope with increased bandwidth and dynamic range without relying on a reduction in component dimension to achieve such results.

SUMMARY OF THE INVENTION

A capacitive BAW gyroscope in which a solid section of the resonator element replaced with a network of spokes and/or beams. At resonance, an outer region of the resonator element undergoes a bulk acoustic mode of vibration while an inner region with spokes and apertures exhibits a flexural mode of vibration. Energy losses associated with the flexural mode of vibration (e.g. thermoelastic damping) serve to reduce the overall quality factor (Q) of the gyroscope. As a result, the relatively low Q of the spoke gyroscope at high resonance frequency creates a large bandwidth and a fast response time without the gyroscope needing to operate in a vacuum. A wide band-pass filter response is hence created for the gyroscope, and, as a result, the bandwidth and dynamic range of the device are increased. Additionally, the −3 dB bandwidth of the resonance mode is larger than the frequency split caused by fabrication errors between the two degenerate modes.

According to one aspect of the disclosure, a gyroscope apparatus comprises a bulk acoustic resonator element defining first and second regions and having a resonance state of operation, wherein during the resonance state the first region undergoes a bulk acoustic mode of vibration while the second region undergoes a flexural mode of vibration. In one embodiment, the resonator element is a disk-shaped structure. In another embodiment, the first and second regions are concentric relative to a central point of the disk-shaped structure.

According to a second aspect of the disclosure, a gyroscope apparatus comprises: a substantially disk-shaped bulk acoustic resonator element having: (i) a first region proximate a central point of the disk-shaped resonator element, (ii) a second region extending inward from a circumference of the resonator element towards the first region, and (iii) a first plurality of spokes connecting the first region with the second region. In one embodiment, the gyroscope apparatus further comprises (iv) at least one ring disposed intermediate the first region and the second region and intersecting the first plurality of spokes. In another embodiment, the gyroscope apparatus further comprises (v) a second plurality of spokes extending inward from the second region toward the first region and connecting the second region with the at least one ring.

According to a third aspect of the disclosure, a gyroscope apparatus comprises: a substantially disk-shaped bulk acoustic resonator element defining (i) a first region extending inward from a circumferential edge of the resonator element towards a central portion of the resonator element but separated therefrom, and (ii) a second region defining a pattern of spokes connecting the first region to the central point of the resonator element; a substrate supporting the resonator element proximate the central point thereof; and a plurality of electrodes surrounding and separated from the resonator element by capacitive gaps. In one embodiment a plurality of bulk acoustic resonator elements and corresponding pluralities of electrodes are integrated on a single substrate to sense rate or angle of rotation about three orthogonal axes.

According to a fourth aspect of the disclosure, an article of manufacture comprises a disk-shaped element defining a circumferential outer portion separated from an central inner portion by a plurality of spokes connecting the inner and outer portions, wherein the disk-shaped element has a thickness of between 30 μm and 80 μm. In one embodiment, the disk-shaped element comprises one of a piezoelectric, metallic or single-crystalline semiconductor material.

According to a fifth aspect of the disclosure, a method of manufacturing a bulk acoustic wave resonator element comprising: A) forming a resonator element having a perimeter edge and a central region; B) etching a plurality of apertures in the resonator element intermediate the central region and the perimeter edge. In one embodiment the apertures collectively define a plurality of spokes extending from the central region at least partially toward the perimeter edge but separated therefrom by an outer region. In another embodiment, the resonator element is disk-shaped having a circumference and the method further comprises: C) etching at least one ring disposed intermediate the central region and the outer region and concentric with the circumference.

BRIEF DESCRIPTION OF THE DRAWINGS

The present invention is illustratively shown and described in reference to the accompanying drawings, in which:

FIGS. 2A-E are ANSYS harmonic simulations of 1.12 mm diameter BAW spoke gyroscope in accordance with one embodiment of the disclosure;

FIGS. 4A-B are cross-sectional views of the spoke gyroscope disclosed herein during various stages of the fabrication process in accordance with one embodiment of the disclosure;

DETAILED DESCRIPTION

Figure 1:
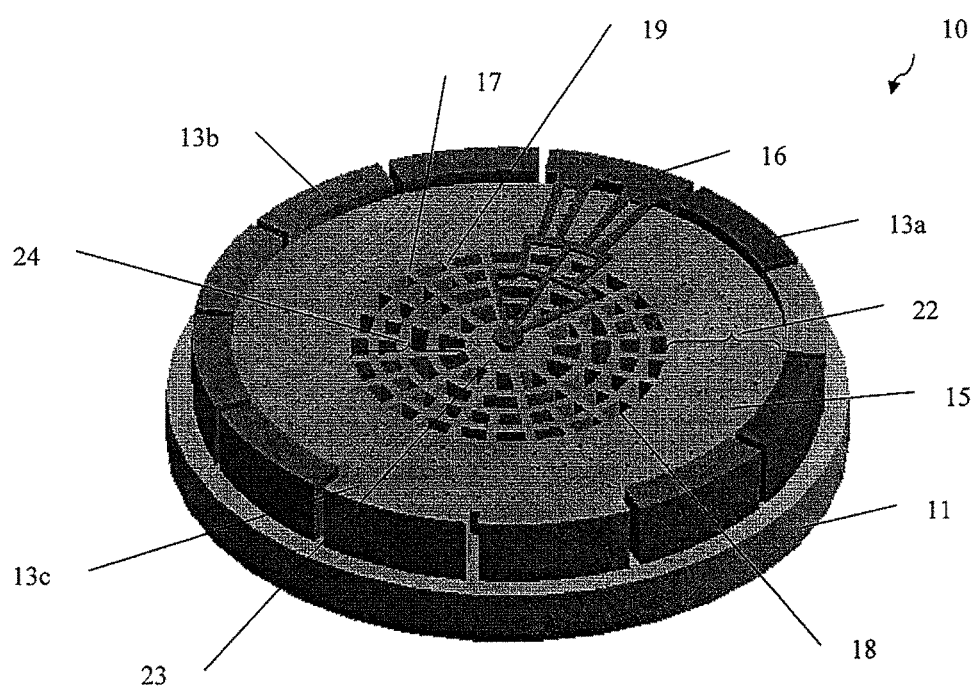
FIG. 1 is a conceptual schematic diagram of the capacitive BAW spoke gyroscope in accordance with one embodiment of the disclosure.
Figure 6A:
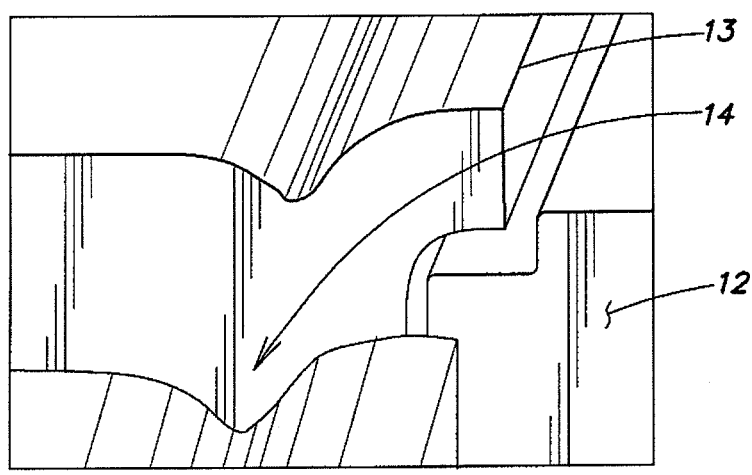
FIG. 6A is SEM view of a trench-refilled poly-electrode and 200 nm air gap of a spoke gyroscope in accordance with one embodiment of the disclosure.

Referring to the Figures, disclosed herein are embodiments of high frequency (MHz range) Z-axis and XY-axis Coriolis-based, capacitive bulk acoustic wave (BAW) gyroscopes 10. As is illustrated in FIG. 1, a gyroscopes 10 comprise a handle substrate 11, which may be implemented with a silicon-on-insulator (SOI) substrate. A resonator element 12, implemented with a resonating disk or resonating disk structure, is supported by an insulating (buried oxide) layer 11b of the handle substrate 11. Alternatively, an electrically conductive material such as polycrystalline silicon can be used to support and attach the resonating disk structure to the handle substrate. A plurality of electrodes surround and are separated from the resonator element 12 by very small capacitive gaps 14, as can be seen in FIG. 6A. The plurality of electrodes 13 generally includes drive electrodes 13a, sense electrodes 13b and electrostatic tuning electrodes 13c. The rest of electrodes 13 can be utilized to align the degenerative bulk acoustic modes with the center of electrodes (i.e. to cancel the quadrature errors). The electrodes 13 excite and detect at least two degenerate bulk acoustic wave resonant modes in the resonator element 12. The positions of electrodes 13 about the perimeter of resonator element 12 illustrated in the Figures, are for exemplary purposes and not meant to be limiting. The capacitive bulk acoustic wave disk gyroscope 10 is designed to operate in either primary or secondary degenerative elliptic modes. The resonator element 12 may be made out of a non-piezoelectric material, such as single-crystalline or polycrystalline silicon. Other semiconducting, piezoelectric or metallic material such as silicon carbide, diamond, nanocrystalline diamond, gallium nitride, aluminum nitride, or quartz can be used to make resonator element 12.

In one embodiment, the resonator element 12 is implemented with a generally a disk-like component, which may be of circular or polygonal shape. In this embodiment, resonator element 12 has an outer region 22 which extends inward towards the center of resonator element 12 from the circumferential edge thereof and is concentric with an inner region 24 in which the concentric ring section has been replaced with a network of spokes 17 and optional circular rings 19. In this embodiment, region 22 has a circular profile and may be solid or perforated with release holes 15, as described herein. Inner region 24 adjacent the outer region is characterized by an open area with a plurality of apertures which collectively define spokes or beams that connect the outer region 22 to the central point of resonator element 12.

Spokes 17 are employed as part of resonator element 12 in order to establish a high frequency and large capacitive sense area at the same time. At resonance, outer region 22, that retains the continuous disk-like shape, undergoes a bulk acoustic mode of vibration while an inner region 24, with spokes 17 and apertures, exhibits a flexural mode of vibration. Energy losses associated with the flexural mode of vibration (e.g. thermoelastic damping) serve to reduce the overall quality factor (Q) of the gyroscope 10. As a result, the relatively low Q (1,000-2,000) of the spoke gyroscope 10 at high resonance frequency creates a large bandwidth and a fast response time without needing vacuum. A wide band-pass filter response is hence created for the gyroscope, as a result of which the bandwidth and dynamic range of the sensor are increased. Additionally, the −3 dB bandwidth of the resonance mode is larger than the frequency split caused by fabrication errors between the two degenerate modes. Depending on the resonance frequency of the spoke gyroscope, the Q can be higher, in the range of 2,000-20,000.

In one embodiment, a first plurality of spokes 17 project radially outward from center point 21 at uniform angles relative to the circumference of resonator element 12, for example 30° or 15° apart, to minimize excessive frequency separation between the drive and sense modes. An optional second plurality of spokes 19 project radially inward from region 22 towards center point 21 but maybe shorter in length than spokes 17, terminating, instead, at one of optional rings 18.

One or more rings 18, which like regions 22 and 24, are concentric to center point 21, may be fabricated as part of the geometry of region 24. Rings 18 add structural integrity, as well as increasing the capacitive surface of region 24 while still allowing inner region 24 to maintain a flexural mode of vibration at resonance.

Although the exact geometry of region inner 24 is illustrated as having different sets of radially extending spokes 17 and 19 intersecting concentric rings 18, it will be obvious to those skilled in the art that other configurations may be utilized while still maintaining the performance advantage described herein. For example, the number and length of spokes 17 and 19 may be different. A typical configuration may involve multiples of four spokes (n=4*k, where k=1, 2, 3, . . . , where n is the number of spokes) to avoid disturbing the mode shapes and to maintain a small frequency separation between the resonance modes of interest. Also, the angle of orientation of spokes 17 and 19 may be tangential to the circular central mass 23 which surrounds center point 21. Spokes 17 may intersect each other in any number of configurations. In addition, although spokes 17 and 19 extend along straight axes, it is contemplated that spokes having various degrees of curvature along their respective lengths may be utilized. Also, combinations of straight and curved spokes may be utilized as well. In addition, the number, distance and orientation relative to central mass 23 of rings 18 may vary, with the rings 18 even functioning as spokes, if oriented off-center relative to central mass 23. Finally, the width of spokes 17, 19 and rings 18 as well as the respective combinations thereof may be vary for optimal performance of a specific embodiment of gyroscope 10.

In addition, 10 μm release holes 15 or perforations, included to facilitate the structural release process, may be equally-spaced in the outer region 22 and oriented similarly to or different than spokes 17 and 19. The plurality of release holes 15 may be repeated at uniform angular intervals, e.g. every 30 degrees, in substrate 11 to minimize the resonance frequency separation between the two degenerative modes. The release holes are designed with small size and are equally-spaced. A variety of hole sizes were designed and simulated in ANSYS to evaluate and optimize the frequency split between the modes. ANSYS simulation results demonstrate a frequency split of only 500 Hz for a 3.21 MHz spoke gyroscope with 10 um diameter uniform holes, as shown in FIG. 2. Furthermore, both theoretical and numerical simulation predicts a linear sensitivity range in excess of 2000 deg/sec for this device. Depending on the frequency split between the drive and sense modes, the noise floor of the device can vary between 1 deg/hr to 1 deg/sec.

Figure 5:
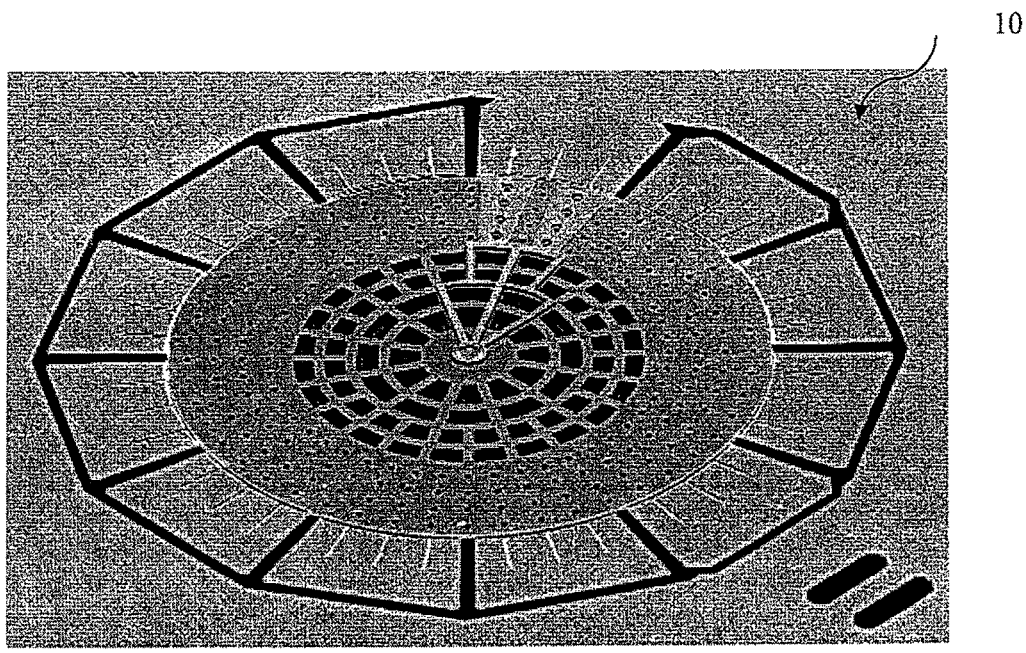
FIG. 5 is SEM view of a 60 μm thick silicon spoke gyroscope in accordance with one embodiment of the disclosure.
Figure 6B:
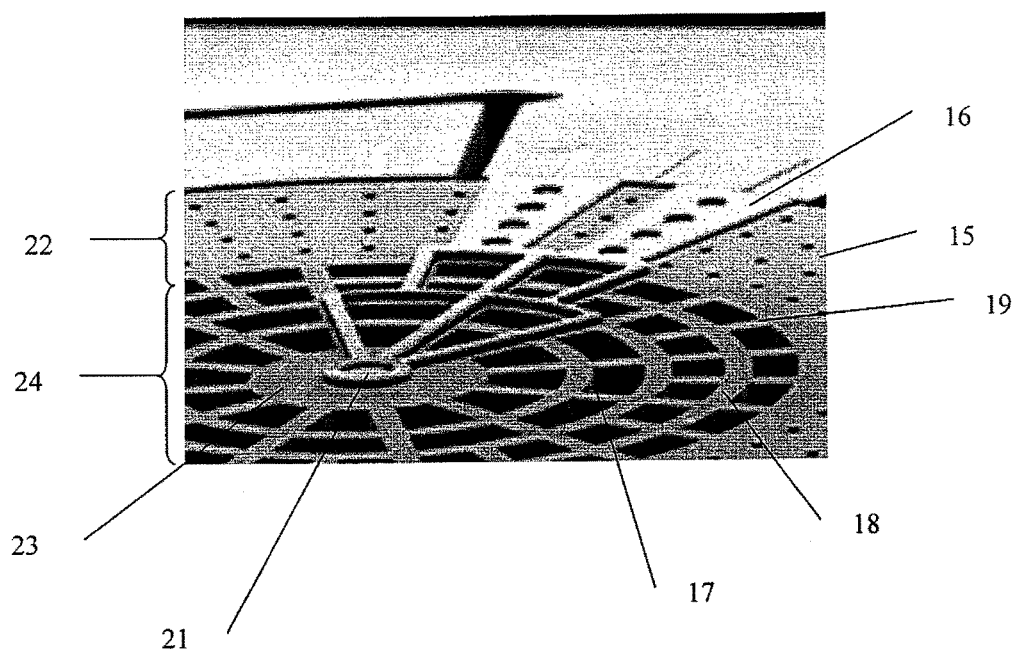
FIG. 6B is SEM view of a suspended polysilicon trace connected to center mass of the spoke gyroscope in accordance with one embodiment of the disclosure.

Scanning Electron Microscope (SEM) images of a fabricated device in accordance with the disclosure are shown in FIGS. 5 and 6A-B. FIG. 5 shows a SEM view of fabricated gyroscope with 560 μm radius. The twelve spokes 17 are arranged at 30° intervals while spokes 19 are arranged at 15° intervals to ensure minimal frequency separation between the two modes. Also shown in the SEM view of FIG. 5 are 10 μm diameter release holes 15 and electrode area with 200 nm capacitive gap for 60 μm thickness substrate. FIG. 6B illustrates a suspended polysilicon trace 16 connected to the center mass 23 of resonator element 12 to provide a DC polarization voltage to the vibrating structure.

FIG. 6A-B illustrate a gyroscope 10 implemented on a 60 μm thick single crystal silicon (SCS) substrate and configured to be operated in high order elliptic modes. The SCS substrate is the top layer (device layer) of SOI substrate 11. High aspect ratio trenches comprising the capacitive gaps 14 are implemented using a combined polysilicon and single crystal-silicon micro-machining process known in the art as HARPSS™, implementing the capacitive disk gyroscopes 10 on thick SOI substrates 11 with very small capacitive gaps 14 (180-400 nm). As illustrated in FIG. 6B, BAW gyroscope 10 is supported at its center with one or more suspended polysilicon traces 16 from the top. Gyroscope 10 can be supported with buried oxide 11b of the SOI substrate 11 at the bottom. Alternatively, gyroscope 10 can be supported with a polycrystalline plug extending through the thickness of the resonator element disk and attaching to the SOI substrate 11 at the center. Also, the suspended polysilicon trace 16 on the disk surface provides the DC bias to the disk 12. In order to capacitively excite and balance the high order out-of-plane elliptical modes, multiple polysilicon electrodes 13, extend over the top of the disk 12 at uniform angular intervals, as illustrated in FIG. 6A. The size of the capacitive gaps 14 between the extended polysilicon electrodes 13 and the resonating disk 12 is similar to the vertical capacitive gaps, typically less than 400 nm.

Figure 2A:
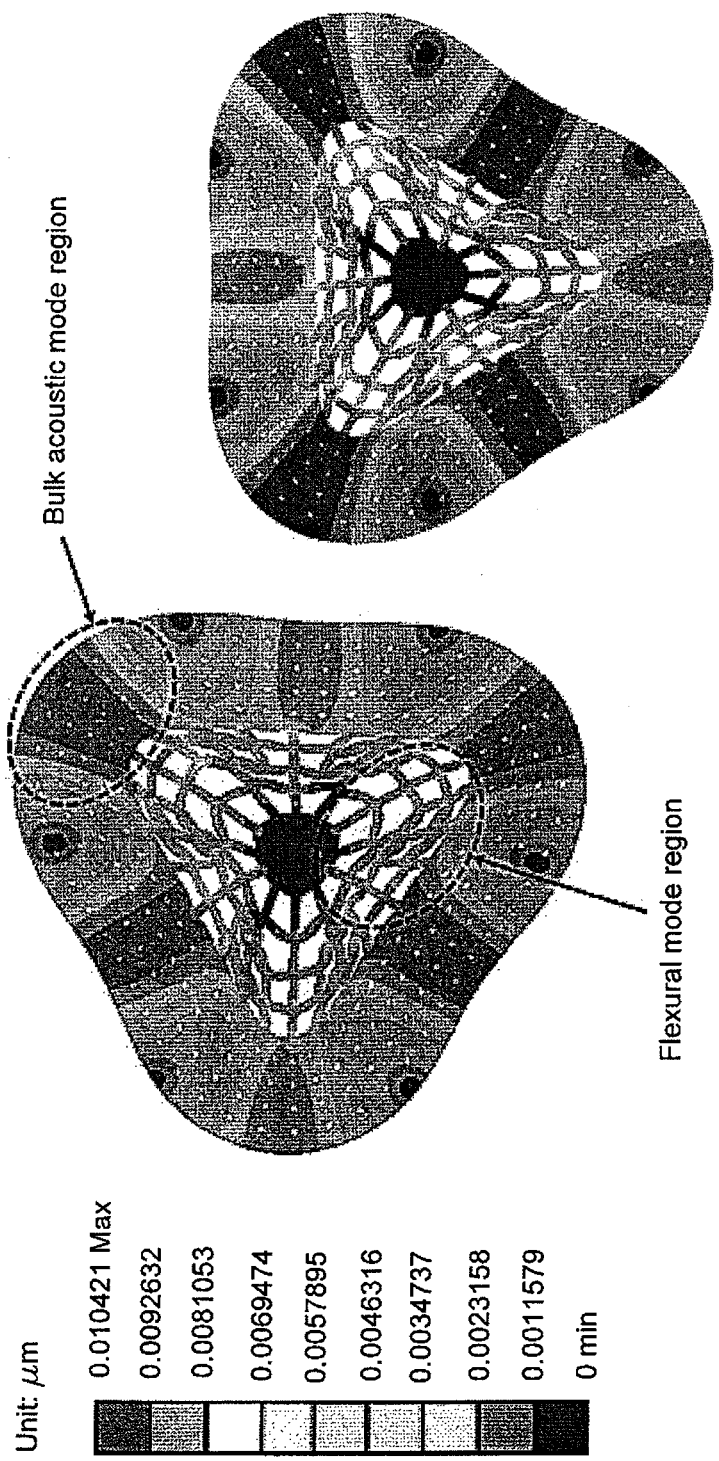
Figure 2B:
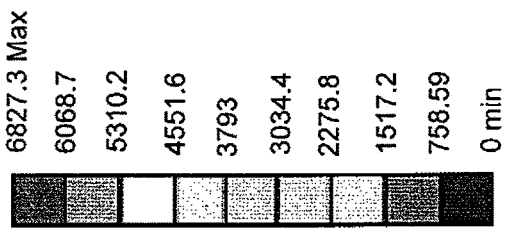
Figure 2C:
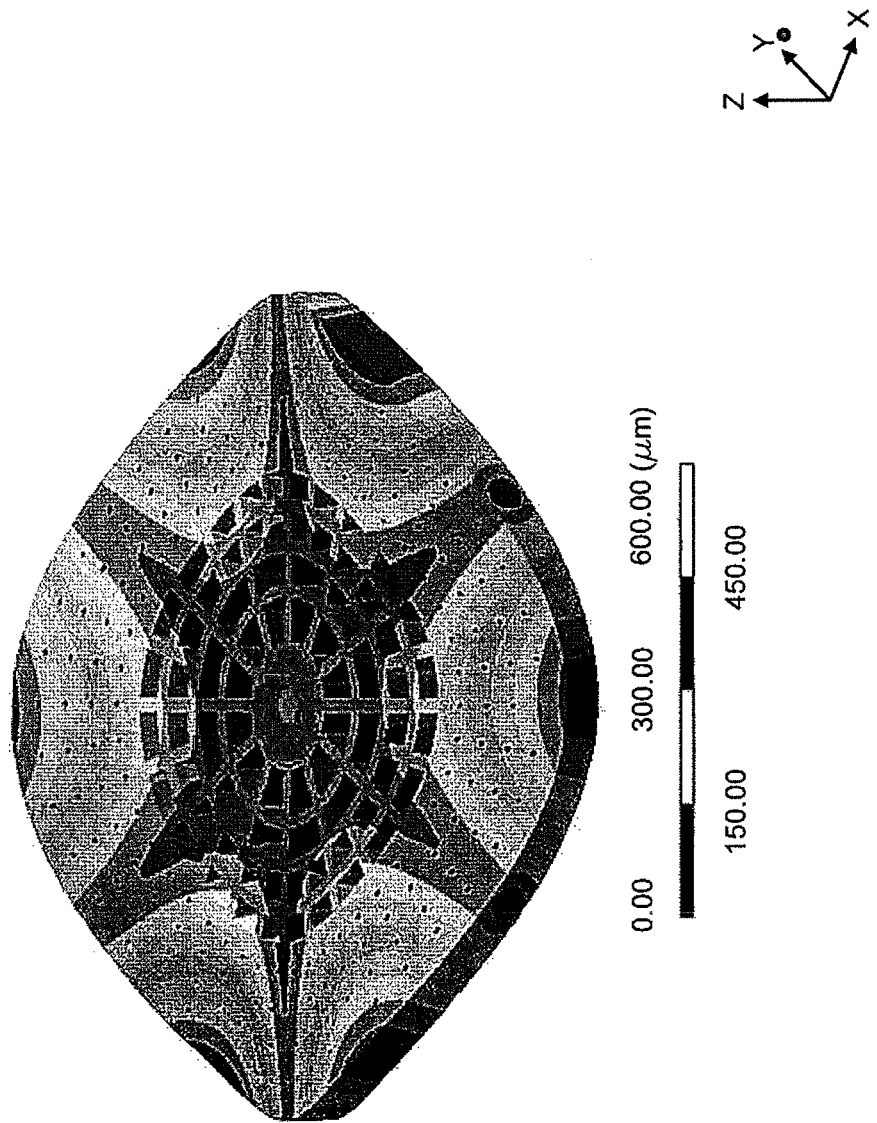
Figure 2D:
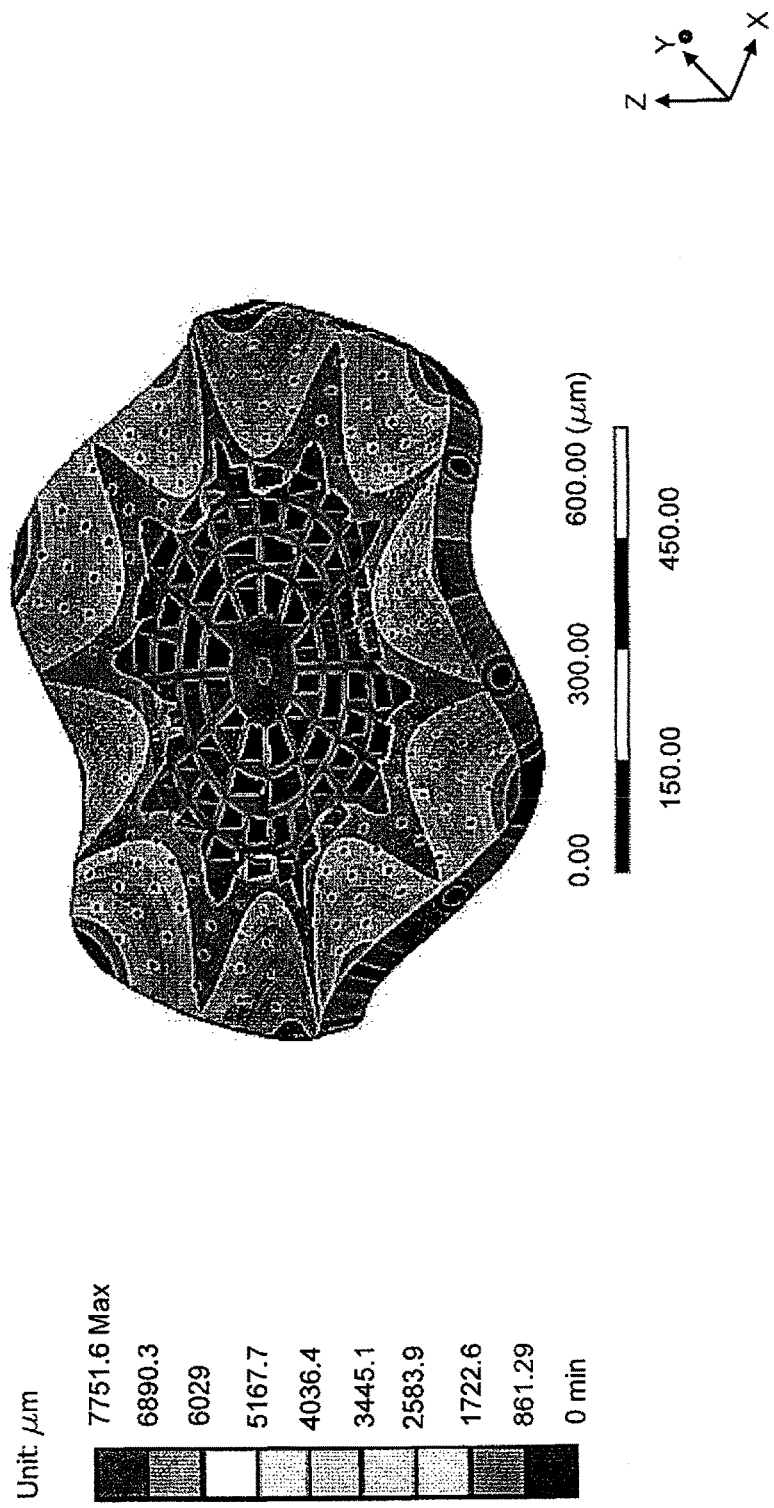
Figure 3:
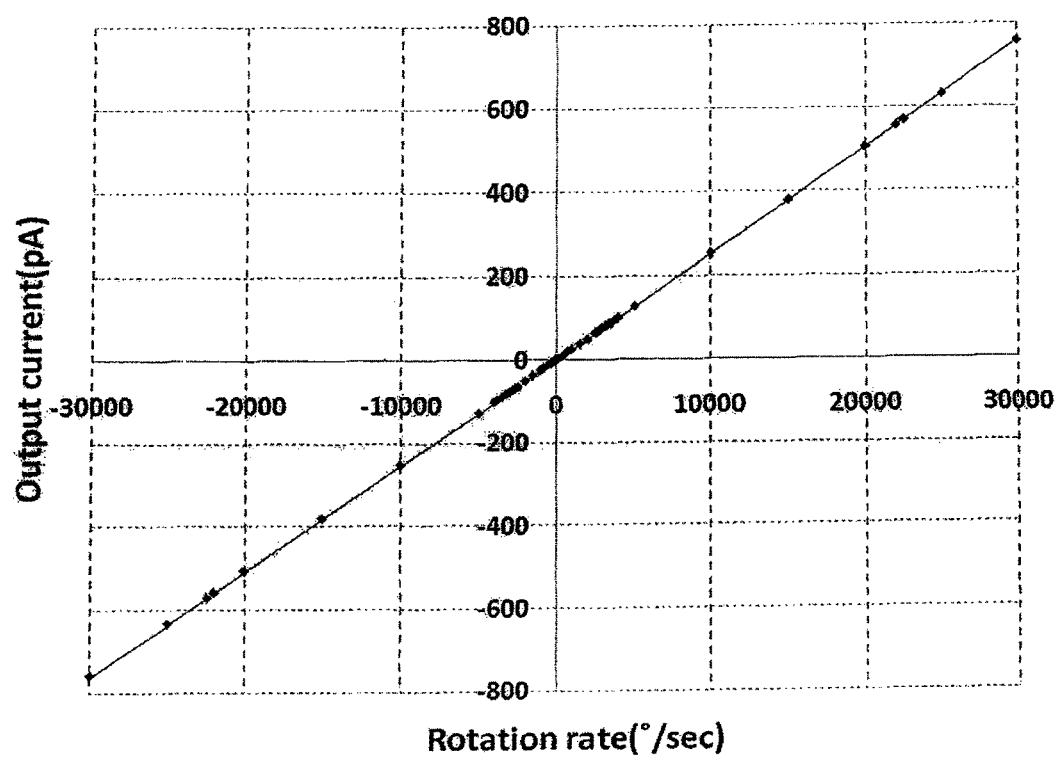
FIG. 3 is a graph of an ANSYS simulation showing sensitivity and dynamic range of 1.12 mm diameter SCS spoke gyroscope in accordance with one embodiment of the disclosure.

An ANSYS electromechanical harmonic simulation was executed to approximate the sensitivity and dynamic range of the gyroscope 10. FIG. 2A illustrates an ANSYS harmonic simulation schematic of 1.12 mm diameter (100) SCS BAW spoke gyroscope showing secondary elliptical drive mode (left) at 3.1815 MHz and sense mode (right) at 3.1795 MHz with ±10 nm deformation. These two modes are used to sense angular velocity around the axis perpendicular to the plane of the substrate (i.e., a yaw gyroscope). First, a worst-case frequency separation of 2 kHz was intentionally created between the two secondary elliptical modes by adjusting the electrical stiffness in the simulation environment to separate the drive and sense peaks. Afterward, the drive mode was excited to a vibration amplitude of 10 nm as illustrated in FIG. 2 while a DC polarization voltage of 10V was applied to the resonating body of the gyroscope. A Q of 1,000 was assumed for the drive and sense modes. Simulated rotation rates were applied, and the Coriolis-induced output current detected at a single sense electrode was plotted as illustrated in FIG. 3. Specifically, FIG. 3 is a graph of an ANSYS simulation showing sensitivity and dynamic range of 1.12 mm diameter SCS spoke gyroscope 10. The spoke gyroscope 10 exhibit a very linear dynamic range in excess of 30,000°/sec with a sensitivity of 2.73 pA/°/sec (per electrode). The overall rate sensitivity of spoke gyroscope 10 can be increased by a factor of 6 through differential sensing and connecting the in-phase sense electrodes. Out of plane resonance modes of the spoke gyroscope, as illustrated in FIG. 2B-E can be used in conjunction with its in-plane resonance modes to sense rotation or angular velocity around an axis in the plane of the substrate 11, i.e. pitch and roll gyroscopes.

A number of prototype capacitive BAW spoke gyroscopes 10 were fabricated on 60 μm thick silicon-on-insulator (SOI) wafers using the HARPSS™ process. An exemplary fabrication process flow is shown in FIGS. 4A-B. The fabrication starts from patterning the oxide mask 31 created by thermal oxidation and PECVD on an SOI substrate 11 (bottom layer 11a, insulating (buried oxide) layer 11b, device layer 11c). Deep trenches 32 are etched through the device layer 11c of 501 wafer to define the spoke structures and release holes 15, and a 200 nm oxidation is done to create a capacitive gap 14 between the vibrating mass 12 and electrodes 13. The trenches 32 are refilled with LPCVD polysilicon 34 after doping and 200 nm sacrificial oxide (SACOX) 33 is patterned from the top surface, as illustrated in FIG. 4B. The second LPCVD polysilicon 34 is deposited, doped, and patterned to define the electrode pads. The final step of the fabrication is a timed release in hydrofluoric acid (HF), leaving a central buried oxide support layer 11b underneath the spoke structure, as illustrated in FIG. 4B.

A 3.12 MHz BAW spoke gyroscope 10 in accordance with the disclosure was fabricated on a 60 µm thick substrate. Upon testing, the device provided a wide −1 dB bandwidth of 1.5 kHz and a linear dynamic range simulated to go as large as ~30,000°/sec. The device operates in air with a low DC polarization voltage of 10V, eliminating the need for vacuum packaging and post-fabrication tuning. Table 1 lists the performance summary for an exemplary 1.12 mm diameter BAW spoke gyroscope as tested.

| Device Parameter | Value |
| --- | --- |
| Operation frequency | 3.12 MHz (Measured) |
| | 3.18 MHz (ANSYS) |
| Device thickness | 60 µm |
| Capacitive gap | 200 nm |
| Polarization voltage | 10 V |
| −3 dB bandwidth | 2.867 kHz |
| −1 dB bandwidth | 1.5 kHz |
| Rate sensitivity | 15.0 µV/°/sec (Measured) |
| Dynamic range | 30,000°/sec (ANSYS) |

During the measurement process, the spoke gyroscope 10 was affixed to a printed circuit board and driven open-loop using an Agilent N4395A network analyzer at a constant vibration amplitude of 0.6 nm. The output sense electrode was connected to a TI OPA657 discrete trans-impedance amplifier front-end with a feedback resistance of 33 k Ohms. Additional voltage amplifiers were added after the trans-impedance stage to provide supplementary gain to compensate for the insertion loss of the device as well as prevent any loading from the measurement equipment that would affect the output sense signal. The frequency response of several prototype devices were tested in air, each showing the expected wide bandpass response of the gyroscope.

Figure 7:
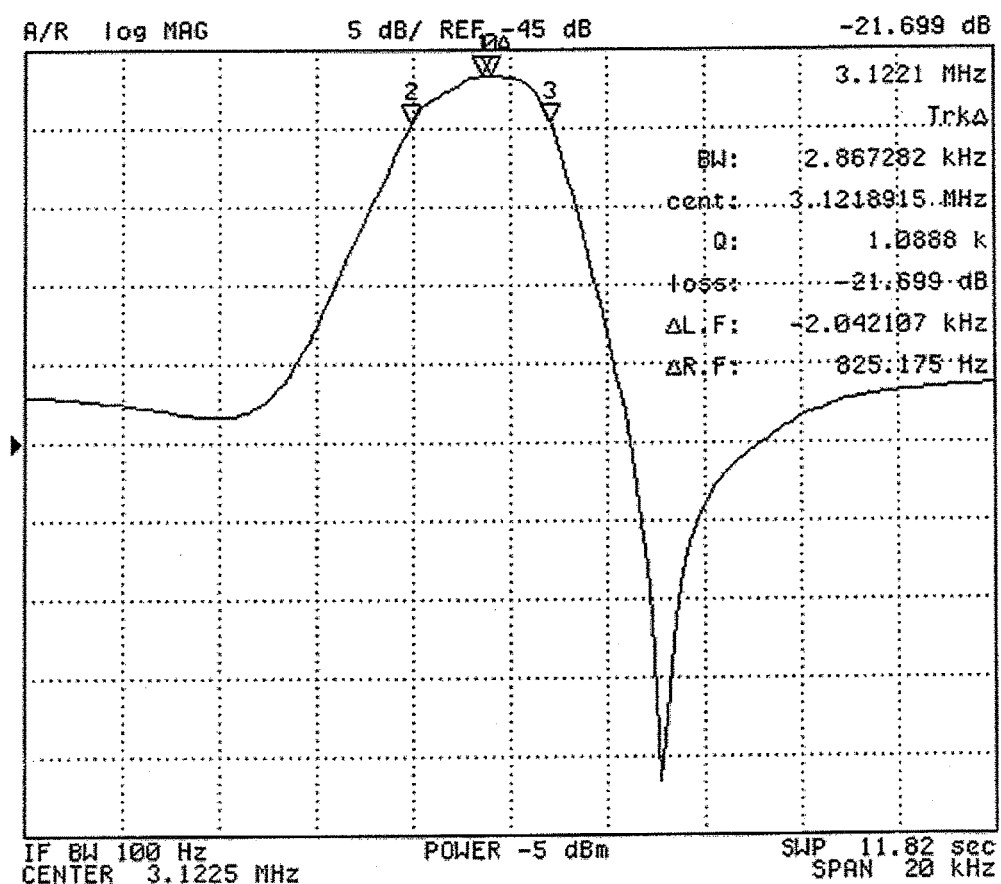
FIG. 7 is a graph of the measured frequency response of a prototype spoke gyroscope in accordance with one embodiment of the disclosure.

FIG. 7 is a graph illustrating the measured frequency response of one prototype gyroscope 10, measured in air, exhibiting a large −3 dB bandwidth of 2.87 kHz at a frequency of ~3.12 MHz. No electronic tuning was performed on this device (all the electrodes around the disk were tied to VP with the exception of drive and sense electrodes). The −1 dB bandwidth of the gyroscope was measured on the network analyzer to be over 1.5 kHz, suggesting that the rate sensitivity of the device will remain constant across a large operational bandwidth of at least 1 kHz.

Figure 8:
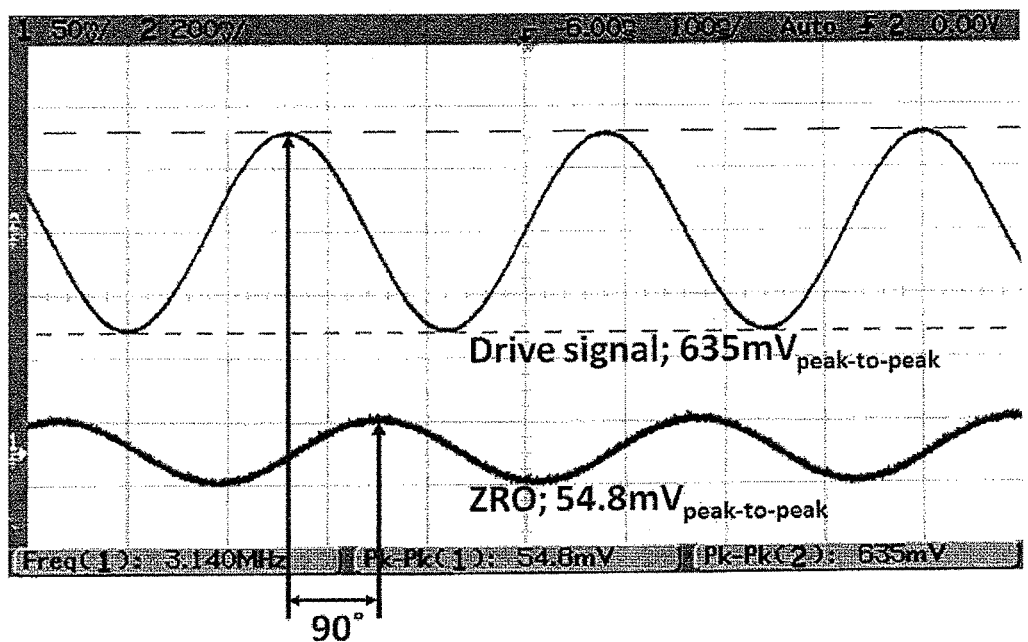
FIG. 8 is a graph of the measured shows the zero rate output (ZRO) or the quadrature signal of the measured device, along with the drive signal applied to the spoke gyroscope in accordance with one embodiment of the disclosure.

FIG. 8 is a graph illustrating the zero rate output (ZRO) or the quadrature signal of the measured device, along with the drive signal applied to the gyro. Following the ZRO measurement, different rotation signals were applied to the spoke gyroscope using a rotation table, and the amplitude modulated sense current was amplified and demodulated using the input drive signal and an Analog Devices AD835 four-quadrant mixer to extract the Coriolis signal.

Figure 9:
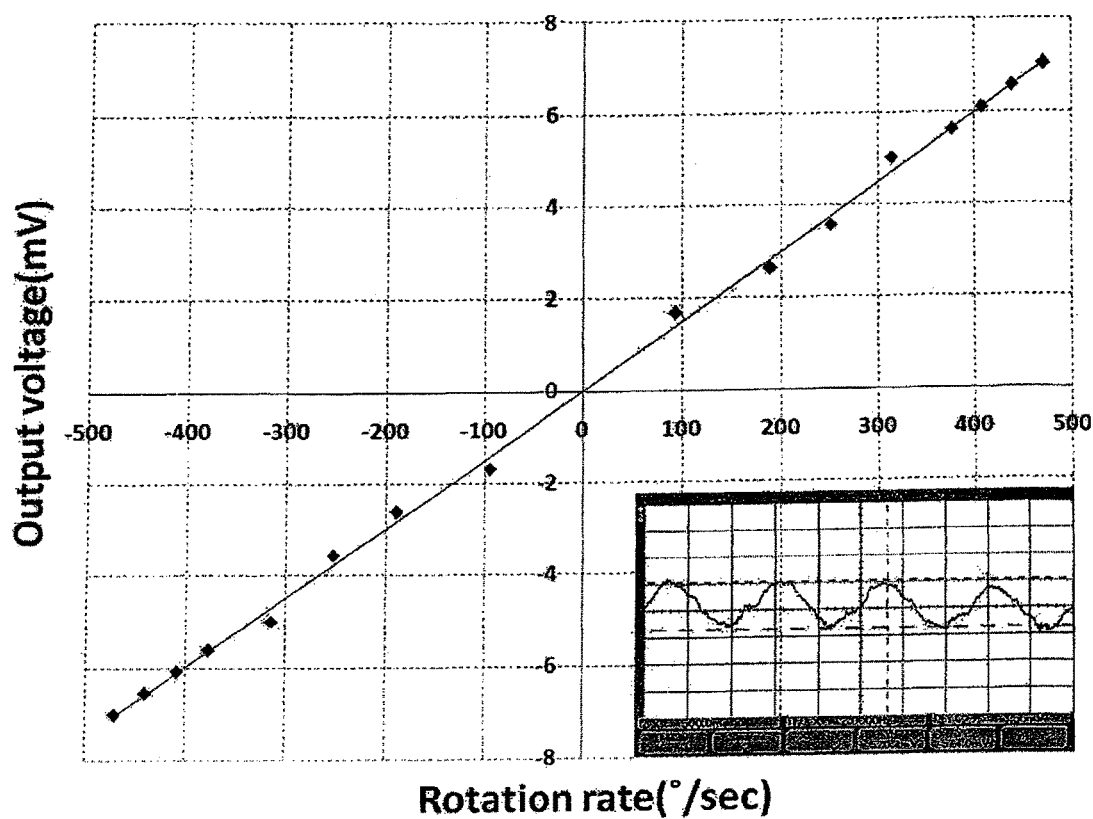
FIG. 9 is a graph illustrating the measured rate sensitivity of a spoke gyroscope in accordance with one embodiment of the disclosure.

FIG. 9 is a graph illustrating the measured rate sensitivity of a spoke gyroscope 10. The linear scale factor of this gyroscope was measured to be ~15.0 µV/°/sec. Although a large dynamic range of ~30,000°/sec was simulated, the measurement was capped at 500°/sec because the rate table could not support rotation rates in excess of this value. The inset in the lower right of FIG. 9 shows the demodulated rotation response of the device to the applied z-axis rotation rate of 250°/second.

Figure 10:
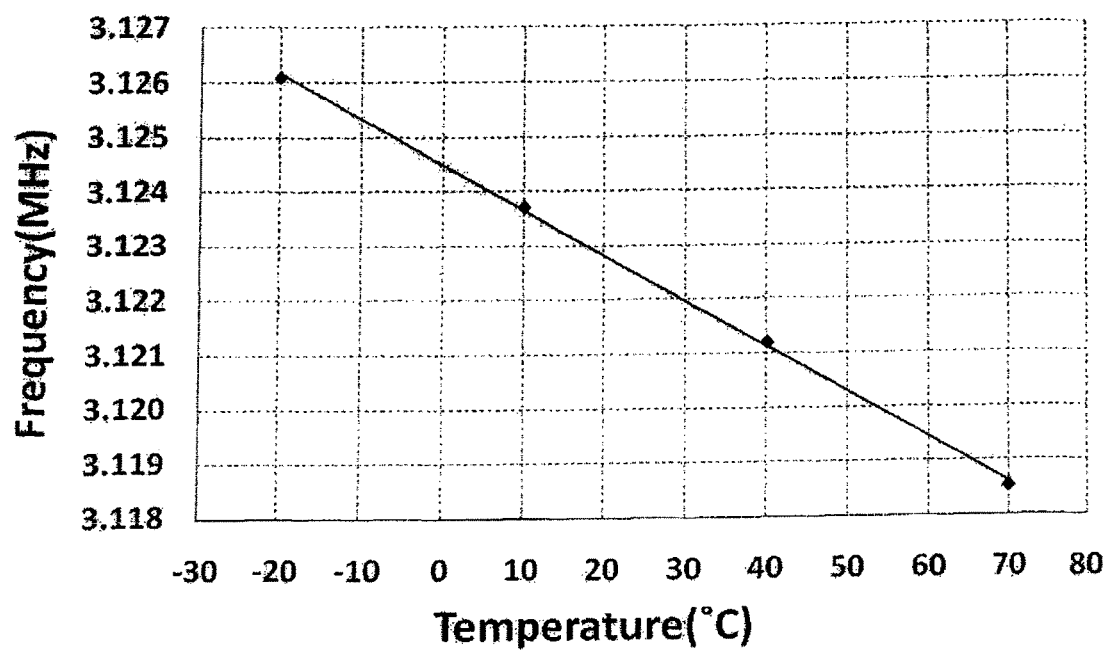
FIG. 10 is a graph illustrating the temperature coefficient of frequency in air for a 1.12 mm diameter and is SCS spoke gyroscope in accordance with one embodiment of the disclosure.

FIG. 10 is a graph illustrating the temperature coefficient of frequency in air for a 1.12 mm diameter (100) SCS spoke gyroscope with uniform 10 µm diameter release holes. Preliminary temperature sensitivity measurements were performed on an unpackaged device over a range of −20° C. to 70° C. The bandwidth and bandpass response of the gyroscope 10 remained relatively constant over this temperature range, although some distortion was seen in the pass band at lower temperatures. The gyroscope showed a frequency response dependency of ~−27 ppm/° C.

Although the measured prototype of the spoke gyroscope 10 disclosed herein operated under mode-coupled condition, simulations show that the sensitivity of the spoke gyroscope will remain relatively constant for a peak separation of up to 2 kHz. The sensitivity can be improved by reducing the capacitive gap size and increasing the device thickness to augment the capacitive area, as well as increasing the drive amplitude. In addition to these changes, the input referred noise of the interface electronics can be reduced by interfacing the device with an application specific integrated circuit (ASIC).

From the foregoing the reader can appreciate that a high frequency bulk acoustic wave (BAW) spoke gyroscope is disclosed that operates at ~3 MHz and has a bandwidth of 3 kHz in air using only a 10V DC polarization voltage. The wide bandwidth of the gyroscope makes it more suitable for use in systems that possess rapid motion sensing electronics. In addition, the operating frequency of the secondary elliptic modes in the spoke structure is high enough to mitigate air damping effects, allowing the device to retain a high Q of ~1000 in atmosphere. This further eliminates the need for vacuum packaging, resulting in better long-term reliability and reduced cost. Furthermore, the device shows a large dynamic range in excess of 2000 deg/sec. In one embodiment, a gyroscope 10 comprises a plurality of bulk acoustic resonator elements 12 and their respective corresponding electrodes 13 integrated on a single substrate 11 to sense the rate or angle of rotation about three orthogonal axes. Each of the resonator element 12 may sense the rate or angle of rotation about either a vertical axis perpendicular to the plane of the substrate or an axis in the plane of the substrate.

The spoke gyroscope disclosed herein is illustratively described with reference to disclosed embodiments. Various modifications and changes may be made to the disclosed embodiments by persons skilled in the art without departing from the scope of the invention as defined in the appended claims.

What is claimed is:

1. A gyroscope apparatus comprising:
   a substantially disk-shaped bulk acoustic resonator element having a resonance state of operation and comprising:
   (i) a circular solid center portion having a center point of the disk-shaped resonator element located therein, the circular solid center portion undergoing substantially bulk acoustic vibration during the resonance state,
   (ii) an outer solid mass region extending inward from a circumference of the resonator element towards the solid center portion, the outer solid mass region undergoing substantially bulk acoustic vibration during the resonance state, and
   (iii) a first plurality of spokes connecting the solid center portion with the outer solid mass region, each of first the plurality of spokes having a first end coupled to the solid center portion and a second end coupled to the outer solid mass region, any of the first plurality of spokes undergoing substantially flexural vibration during the resonance state, wherein the outer solid mass region has larger volume compared to each one of the circular solid center portion and the plurality of the spokes.

2. The apparatus of claim 1 wherein adjacent of the first plurality of spokes are separated by uniform angles relative to the circumference of the resonator element.

3. The apparatus of claim 1 further comprising:
(iv) a plurality of rings disposed intermediate the solid center portion and the outer solid mass region and intersecting the first plurality of spokes.

4. The apparatus of claim 3 further comprising:
(v) a second plurality of spokes extending inward from the outer solid mass region toward the solid center portion and connecting the outer solid mass region with the at least one ring.

5. The apparatus of claim 4 wherein adjacent of the second plurality of spokes are separated by uniform angles relative to the circumference of the resonator element.

6. A gyroscope apparatus comprising:
a substantially disk-shaped bulk acoustic resonator element having a resonance state of operation, the resonator element defining (i) a solid outer mass region extending inward from a circumferential edge of the resonator element towards a circular solid center portion having a center point of the resonator element located therein, but separated from the solid center portion, the solid outer mass region and the circular solid center portion undergoing substantially bulk acoustic vibration during the resonance state, (ii) a substantially open region defining a plurality of spokes connecting the solid outer mass region to the circular solid center portion of the resonator element, any of the plurality of spokes undergoing substantially flexural vibration during the resonance state, and (iii) at least one ring disposed intermediate the circular solid center portion and the solid outer mass region and intersecting the plurality of spokes, each of the plurality of spokes having a first end coupled to the solid outer mass region and a second end coupled to the circular solid center portion;
a substrate supporting the resonator element proximate the circular solid center portion thereof; and
a plurality of electrodes surrounding and separated from the resonator element by capacitive gaps,
wherein the solid outer mass region has larger volume compared to each one of the circular solid center portion and the plurality of the spokes.

7. The apparatus recited in claim 6 wherein the capacitive gaps are on the order of 400 nanometers or less.

8. The apparatus recited in claim 6 further comprising direct current and alternating current voltage sources for excitation of the apparatus.

9. The apparatus recited in claim 6 wherein the resonator element is a disk-shaped structure made of a one of polysilicon and single-crystalline silicon.

10. The apparatus of claim 6, wherein the resonator element is formed of a semiconducting, piezoelectric or metallic material.

11. The apparatus recited in claim 6 wherein the solid outer mass region further comprises a plurality of perforation holes.

12. The apparatus recited in claim 6 wherein a plurality of bulk acoustic resonator elements and corresponding pluralities of electrodes are integrated on a single substrate to sense rate or angle of rotation about three orthogonal axes.

13. The apparatus recited in claim 6 which senses rate or angle of rotation about a vertical axis perpendicular to the plane of the substrate.

14. The apparatus recited in claim 6 which senses rate or angle of rotation about at least one axis in the plane of the substrate.

15. The apparatus recited in claim 6 further comprising:
a plurality of perforations extending through the resonator element in the solid outer mass region thereof.

16. An article of manufacture comprising a disk-shaped resonator element defining a circumferential outer solid mass portion separated from a circular solid center portion of the disk-shaped element by a plurality of straight spokes extending radially outward from the circular solid center portion and connecting the circular solid center portion to the outer solid mass portion, and further defining at least one ring disposed intermediate the circular solid center portion and the outer solid mass region and intersecting the plurality of spokes, the disk-shaped element having a resonance state of operation wherein any of the plurality of spokes undergoes substantially flexural vibration during the resonance state, and the outer solid mass portion and the circular solid center portion undergo substantially bulk acoustic vibration during the resonance state, wherein the outer solid mass region has larger volume compared to each one of the circular solid center portion and the plurality of the spokes.

17. The article of manufacture of claim 16, wherein the disk-shaped element comprises one of a piezoelectric, metallic or single-crystalline semiconductor material.

18. A method of manufacturing a bulk acoustic wave resonator element comprising:
A) forming a resonator element having a solid resonant mass with a perimeter edge and a circular solid center portion;
B) etching a plurality of apertures in the resonator element to collectively define a plurality of spokes extending from the circular solid center portion at least partially toward the perimeter edge but separated therefrom by the solid resonant mass; and
C) etching a plurality of apertures in the resonator element to collectively define at least one ring disposed intermediate the circular solid center portion and the solid resonant mass,
wherein the solid resonant mass has a larger volume compared to a volume of each one of the circular solid center portion and the plurality of the spokes, and
wherein the resonator element as manufactured has a resonance state of operation wherein any of the plurality of spokes undergo flexural vibration during the resonance state, and the solid resonant mass and the circular solid center portion undergoes bulk acoustic vibration during the resonance state.

19. The method of claim 18, wherein the resonator element is disk-shaped having a circumference and wherein (C) comprises:
C1) etching a plurality of apertures in the resonator element to collectively define a plurality of rings disposed intermediate the circular solid center portion and the solid resonant mass and concentric with the circumference.

20. The method of claim 18, wherein the method further comprises:
C) etching a plurality of holes in the solid resonant mass, the holes having less area than the apertures.

21. The method of claim 18, wherein the resonator element comprises one of a piezoelectric, metallic or single-crystalline semiconductor material.

22. The apparatus of claim 2 wherein the plurality of spokes comprises a number multiple of 4.

23. The apparatus of claim 2 wherein twelve spokes are separated by uniform angles relative to the circumference of the resonator element.

24. The apparatus of claim 1 wherein the outer solid mass region forms an annulus having a width larger than the annulus thickness.

25. The apparatus of claim 6 wherein the outer solid mass region forms an annulus having a width larger than the annulus thickness.

26. The apparatus of claim 1 wherein a radial width of the outer solid mass region is larger than a radial width of each one of the first plurality of the spokes.

27. The apparatus of claim 4 wherein a trace is suspended opposite one of the first plurality of spokes and the second plurality of spokes.

28. The apparatus of claim 6 wherein a radial width of the outer solid mass region is larger than a radial width of each one of the plurality of the spokes.

29. The apparatus of claim 6 wherein a trace is suspended opposite one of the plurality of spokes.

\* \* \* \* \*